United States Patent [19]

Hegemann et al.

[11] Patent Number: 4,691,002

[45] Date of Patent: Sep. 1, 1987

[54] UNSATURATED HOMO- AND/OR COPOLYMERIZABLE POLYESTERS

[75] Inventors: Günther Hegemann; Karin Miedeck, both of Hamburg, Fed. Rep. of Germany

[73] Assignee: BASF Farben & Fasern AG, Münster-Hiltrup, Fed. Rep. of Germany

[21] Appl. No.: 823,980

[22] Filed: Jan. 30, 1986

Related U.S. Application Data

[63] Continuation of Ser. No. 519,489, Aug. 1, 1983, abandoned.

[30] Foreign Application Priority Data

Aug. 1, 1983 [DE] Fed. Rep. of Germany ....... 3229639

[51] Int. Cl.$^4$ ...................... C08G 63/52; C08G 63/54; C08G 63/68; C08G 63/76
[52] U.S. Cl. .................................... 528/289; 528/296; 528/303; 528/306; 528/307; 525/440; 525/33; 525/34
[58] Field of Search ............... 528/289, 303, 306, 296; 525/440

[56] References Cited

U.S. PATENT DOCUMENTS

| | | | |
|---|---|---|---|
| 3,515,772 | 6/1970 | Lubowitz | 528/306 |
| 4,355,123 | 10/1982 | Dudgeon | 528/303 |
| 4,370,446 | 1/1983 | Toyoda | 528/306 |
| 4,477,653 | 10/1984 | Hegemann | 528/289 |

FOREIGN PATENT DOCUMENTS

| | | | |
|---|---|---|---|
| 53-127594 | 11/1978 | Japan | 528/289 |
| 54-70396 | 6/1979 | Japan | 528/289 |
| 58-101110 | 6/1983 | Japan | 528/303 |

Primary Examiner—C. Warren Ivy
Attorney, Agent, or Firm—Kenyon & Kenyon

[57] ABSTRACT

The invention relates to unsaturated homo- and/or copolymerizable polyesters which have been prepared from an alcohol component comprising a multivalent alcohol, a carboxylic acid component comprising a multivalent carboxylic acid and optionally, hydroxycarboxylic acids or their derivatives capable of forming esters, and an acid component selected from the group consisting of maleic acid, fumaric acid, itaconic acid, mesaconic acid, aconitic acid, their derivatives capable of forming esters and mixtures thereof. As part of the alcohol coponent, hydroxylated polybutadiene with an average molecular weight of 2400 to 3000 and a hydroxy-functionality of 2.2 to 2.4 is condensed into the polyester. The polyesters exhibit useful flow anomalies which are due to their molecular structure.

10 Claims, No Drawings

UNSATURATED HOMO- AND/OR COPOLYMERIZABLE POLYESTERS

This application is a continuation of application Ser. No. 519,489 filed Aug. 1, 1983 now abandoned.

BACKGROUND OF THE INVENTION

The invention relates to unsaturated homo- and/or copolymerizable polyesters, prepared from an alcohol component comprising a multivalent alcohol, an acid component comprising a multivalent carboxylic acid, and optionally hydroxycarboxylic acids or their derivaties which are capable of forming esters, and wherein the acid component comprises an acid selected from the group consisting of maleic acid, fumaric acid, itaconic acid, mesaconic acid, aconitic acid, their derivatives which are capable of forming esters, and mixtures thereof; a method for manufacturing same and their use.

The manufacture and processing of homo- and/or copolymerizable unsaturated polyesters is known. Unsaturated polyester resins can be produced by copolyesterification of mono- and/or multivalent alcohols with mono- or polyfunctional carboxylic acids and/or, optionally, hydroxycarboxylic acids comprising alcoholic hydroxyl groups or also using or co-using their derivatives which are capable of forming esters. In the process at least one compound which is olefinically unsaturated and homo- or copolymerizable is condensed into the polyester resin, where the average functionality and the ratio of hydroxyl to carboxy groups must be chosen according to rules well-known by the art so that the formation of polyesters is assured. The resultant resins can then be hardened into thermosetting plastics. Thick layers may be formed, preferably by the addition of radical-furnishing compounds, and optionally by the addition of olefinically unsaturated copolymerizable monomer compounds.

These known compounds are used particularly in the form of their solutions in copolymerizable vinyl and/or allyl monomers as casting resins for impregnating electric machines or parts thereof, such as stators of electric motors or transformers. Impregnating methods such as immersion or sprinkling may be employed. Furthermore, electrical or electronic components or complete circuits can be superficially coated.

After the immersion of the machines or components, the latter are conducted through an evaporation and dripping zone and then the adhered polyester resin is hardened in an oven. With this method, dripping losses first occur in the dripping zone. Even though the resin accumulating in this zone can be returned to the immersion tank, there is the disadvantage that the dripping leads to incomplete impregnation. Furthermore, additional dripping losses occur in the oven prior to hardening if the viscosity of the casting resin drops due to the increase in temperature. This is particularly disadvantageous because the material dripping off in the oven is hardened and so cannot be reused. This material also leads to considerable contamination of the oven.

Further problems which result from the dripping-off or running-down of the casting resins is the occurrence of non-uniform layer thicknesses which increase from the top to the bottom of the coated components and the development of beads at the lower edge of coated components.

To avoid these disadvantages it is known to generate structural viscosity or thixotropy in the casting resins by adding to them substances which produce flow anomalies therein. For this purpose, substances such as pyrogenic silica, asbestos fibers, quartz meal, microdolomite or liquid components such as castor oil derivatives, acrylic resins or silicone are used. Several disadvantages are associated with the use of these additives. The inorganic components do not yield clear solutions and it is not always simple to work them into the polyester resins. The above-mentioned liquid components disadvantageously function to soften the resins. Furthermore, skin can develop on the casting resins if these additives are used.

It is an object of the invention to avoid these disadvantages of the state of the art and to create polyesters which exhibit useful flow anomalies due to their molecular structure and exhibit structural viscosity or thixotropic behavior without the addition of supplementary compounds.

BRIEF DESCRIPTION OF THE INVENTION

It has now been found surprisingly that this problem can be solved by the incorporation of long-chain alcohols into the polyesters, where these long-chain alcohols replace part of the customary low-molecular weight alcohols. The subject of the invention is therefore the above-described unsaturated homo- and/or copolymerizable polyesters which are characterized by the structural feature that hydroxylated polybutadiene with an average molecular weight of 2400 to 3000 and a hydroxy-functionality of about 2.2 to 2.4 is condensed into the polyester as part of the alcohol component.

Preferably, the amount of hydroxylated polybutadiene used is about 1 to 10 mole percent of the total amount of alcohols. The polyesters so modified exhibit structure-viscosity or thixotropic behavior without the addition of substances traditionally used for obtaining the desired flow anomalies. With a mole percent of hydroxylated polybutadiene of less than about 1%, the effect of the modification is too small, and with a content of more than about 10% there is danger of gelling.

DETAILED DESCRIPTION OF THE INVENTION

From the large body of knowledge regarding the preparation of unsaturated polyesters, a number of mono- and multifunctional reactants may be used to prepare compounds within the scope of this invention. Representative alcohols which can be used include, for example, alkanols such as methanol, ethanol, propanol, isopropanol, cyclohexanol, tetrahydrobenzyl alcohol, tricyclodecanol and benzyl alcohol. Polyols such as glycol propane diols, butane diols, hexane diols, trimethylhexane diols, cyclohexane dimethanol, 1,1-bishydroxymethylcyclohexene-3, tricyclodecane diol, tricyclodecane monoglycerin ether and the like may also be used.

Useful as carboxylic acids include lauric acid, oleic acid, benzoic acid, abietic acid, and the like. Useful multivalent acids include succinic acid, adipic acid, ortho-, iso- and terephthalic acid, tetrahydrophthalic acid, hexahydrophthalic acid, hexachloroendomethylenetetrahydrophthalic acid, tetrachlorophthalic acid, tetrabromophthalic acid, trimellitic acid, pyromellitic acid, and other carboxylic acids which, according to the state of the art, can be used for the preparation of unsaturated polyesters.

Customary homo- or copolymerizable olefinically unsaturated compounds which are used for the preparation of unsaturated polyesters and which are useful in the practice of the present invention include maleic acid, fumaric acid, itaconic acid, mesaconic acid, aconitic acid and mixtures thereof.

Instead of the free alcohols or acids, their functional derivatives such as esters, anhydrides or chlorides may also be used in methods well known to the art.

An essential feature of the present invention is the replacement of a part of the alcohols customarily used in the preparation of unsaturated polyesters with a hydroxylated polybutadiene having an average molecular weight of about 2400 to 3000 and an average hydroxy-functionality of about 2.2 to 2.4. One known commercially-available product of this type is a liquid polybutadiene with end-position primary hydroxyl groups which are about 95% allylic. The microstructure of this polybutadiene was determined as follows: 60% 1,4-trans-, 20% 1,4-cis-, and 20% vinyl configuration.

To increase the continuous thermal stressability of the unsaturated polyesters in the hardened condition according to this invention, the polyesters are advantageously modified by the addition of nitrogen-containing compounds of the general formulae:

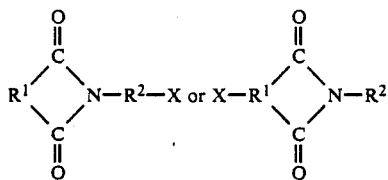

wherein $R^1$ is an aliphatic radical in which the two carboxyl radicals capable of forming anhydrides are in the 1,2- or 1,3-position; $R^2$ is an alkyl or aryl radical; and X is an OH or $CO_2H$ radical, and wherein the linkage of the hydroxyl groups on the nitrogen-containing compounds may occur at the hydroxyl groups of the unsaturated polyester via reaction with di- or triisocyanates. $R^1$ may also be an aromatic radical or an olefinic radical.

Compound (a) is representative of these nitrogen-containing compounds which are characterized by the imide ring I and which can be used as an end-group. Compound (a) can readily be prepared by reacting phthalic acid anhydride with monoethanolamine:

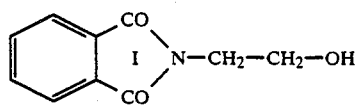

Useful amides representing modifications of compound (a) can easily be obtained if instead of the simple phthalic acid anhydride, substituted, partially hydrogenated or more complex derivatives of o-phthalic acid are employed in the reaction with the amine. For example, halogenated phthalic acid anhydrides (tetrachloro- or tetrabromo-phthalic acid anhydride), and alkylated or hydrogenated compounds (methyl, tetrahydro, hexahydro, methylhexahydro, endomethylenetetrahydrophthalic acid anhydride), may be used. Other useful cyclic imides may be prepared employing compounds such as maleic or citraconic acid, succinic acid or their derivatives, i.e., their alkylated derivatives or the addition of products of maleic or citraconic acid with dicyclopentadiene, unsaturated ketones or diolefins. Compounds such as trimellitic acid anhydride may also be used. When reacted with a suitable amine, for instance, with monobutylamine, this acid furnishes a building block (b) in which the radical X is represented by the carboxyl radical attached to the aromatic ring $R^1$.

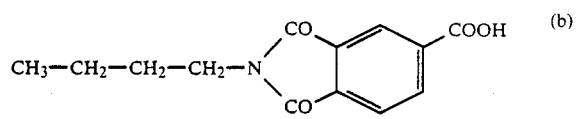

Likewise, imides formed from compounds such as 1,8-naphthalene dicarboxylic acid or naphthalene-1,2-dicarboxylic acid in the form of their anhydrides are useful in the practice of the present invention (c, d), and further formula diagrams (e to g) show further possibilities of variations.

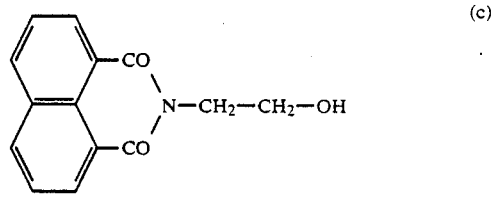

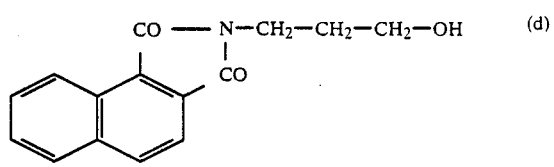

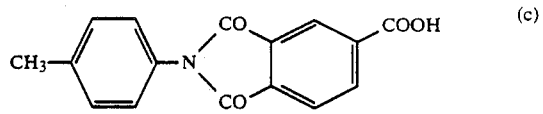

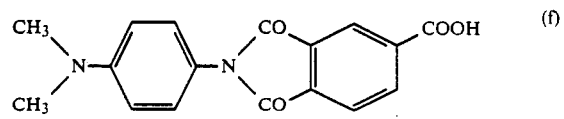

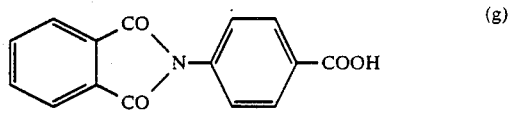

On the other hand, the simple ethanolamine can be replaced by a wide variety of amino compounds, for instance, by isomeric propanol or butanol amines or other higher homologs, by phenylether alcohols aminated in the ring, by amino-carboxylic acids or by the ethoxylation products of phenols aminated in the ring.

Methods for the preparation of cyclic imides are well known in the art, for example, by moderately heating the starting materials in solution or in a melt and the imides can be isolated in many cases as highly crystalline compounds. However, it is also possible to proceed without isolation of the crude imide products in such a manner that the product formed in the melt or solution may be included like an ordinary monofunctional compound into the structure of a known unsaturated polyester by admixing the raw materials followed by heating the mixture, or by fusion condensation of the imide building block with an already largely-preformed polyester which contains free OH or COOH groups and by condensing the product immediately with the prepared unsaturated polyesters into the end product. In any case, the durability limits and other properties of the imide building block must, of course, be taken into consideration. The imide groups are added easily via reaction with di- or triisocyanates, where either the preformed hydroxyl polyester is reacted with excess isocyanate whereupon a reaction with a hydroxyl imide building block can take place at the remaining NCO groups.

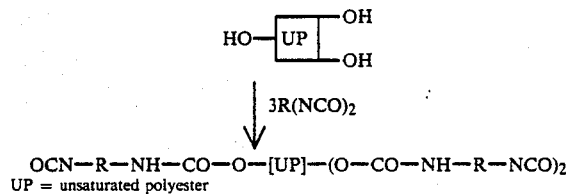

OCN—R—NH—CO—O—[UP]—(O—CO—NH—R—NCO)$_2$
UP = unsaturated polyester

Alternatively a hydroxyl-imide system is first reacted with excess diisocyanate, and the resultant product is brought to reaction with a hydroxyl polyester:

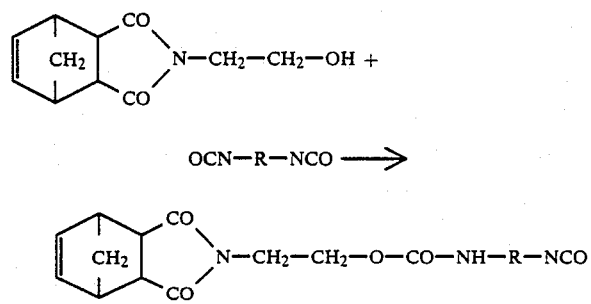

When present as the monofunctional end-group, these rather differently structured imide building blocks determine the chain length, the molecular weight, the molecular shape and thereby affect the technically important viscosity of the polyesters into which they are introduced.

Besides these monofunctional imide building blocks, imide radicals can also be incorporated into the polyester via difunctional imide building blocks. Advantageously, radicals of a dicarboxylic acid, a dialcohol and/or a hydroxy carboxylic acid containing at least one 5-membered cyclic imide group are condensed into the polyesters. The compounds which can be used in the preparation of the polyesters and which contain one or more 5-membered cyclic imide group must also contain two functional groups which can enter into the formation reaction of the unsaturated polyester resin. Of interest here are divalent alcohols, divalent carboxylic acids and/or hydroxy carboxylic acids or their derivatives which are capable of forming esters. They will contain at least one 5-membered imide ring in their molecule. In one particularly important embodiment of the invention, the imide rings are arranged in the molecules so that the functional groups entering into the formation of the polyester resin are in communication with each other via different ring members of the imide rings. Such dicarboxylic acids and dialcohols or hydroxy carboxylic acids are known particularly from the art which relates to the manufacture of polyester resins with saturated imide rings. Useful compounds of this type are disclosed in British Pat. No. 973,377 and in French Pat. No. 1,368,741. They can be manufactured by known methods, for instance, from compounds containing primary amino groups with compounds containing at least two carboxyl groups which are capable of forming a cyclic imide group with the provision that the starting molecules used for forming an imide group-containing molecule together contain two further groups capable of forming esters which are not required for forming the imide.

The compounds containing imide groups may be prepared separately and then added to the reaction mixture used for manufacturing the polyesters or may also be formed directly in the reaction mixture from their starting materials in the presence of further components of the polyester resin, as is described for saturated polyester resin, for instance, as in the patents cited above. In this case it is to be noted, however, that the particular unsaturated polyester component, particularly the unsaturated polycarboxylic acids, should be added to the reaction mixture only after a sufficient, preferably complete formation of imide rings has occurred, in order to preclude undesired side reactions. Groups capable of forming esters include primary or secondary alcohols and carboxyl groups as well as functional groups derived therefrom such as anhydrides, halogenides, esters and epoxides.

Examples of compounds useful in the practice of the present invention are the imides depicted in column A of Table I which can be prepared from the starting materials listed in columns B and C of Table I.

TABLE I
PREPARATION OF IMIDES

| | A | B | C |
|---|---|---|---|
| (1) | [imide of pyromellitic dianhydride with two HOCH₂CH₂–N groups] | H₂N—CH₂—CH₂—OH | [pyromellitic dianhydride] (PMA) |
| (2) | [imide with CH₃-CH(OH)-CH₂–N groups on both sides] | CH₃ H₂N—CH₂—CH—OH | (PMA) |
| (3) | [imide with HOOC—CH₂–N groups on both sides] | H₂N—CH₂—COOH | (PMA) |
| (4) | [imide with 4-carboxyphenyl groups on both N] | [4-aminobenzoic acid] | (PMA) |
| (5) | [bis-imide based on benzophenone dianhydride with HOCH₂CH₂–N groups] | H₂N—CH₂—CH₂—OH | [3,3',4,4'-benzophenonetetracarboxylic dianhydride] |

TABLE I-continued
PREPARATION OF IMIDES

| | A | B | C |
|---|---|---|---|
| (6) | imide of butanetetracarboxylic dianhydride with 2-aminoethanol (HOCH₂CH₂–N and CH₂CH₂–OH termini) | $H_2N-CH_2-CH_2-OH$ | butanetetracarboxylic dianhydride |
| (7) | N,N'-bis(trimellitimide) of ethylenediamine | $H_2N-CH_2-CH_2-NH_2$ | (TMA) trimellitic anhydride |
| (8) | N,N'-bis(trimellitimide) of hexamethylenediamine | $H_2N-(CH_2)_6-NH_2$ | TMA |
| (9) | N,N'-bis(trimellitimide) of 2,2,4-trimethylhexamethylenediamine | $H_2N-CH_2-CH(CH_3)-CH_2-C(CH_3)_2-CH_2-CH_2-NH_2$ | TMA |
| (10) | N,N'-bis(trimellitimide) of m-phenylenediamine | m-phenylenediamine ($H_2N$–C₆H₄–$NH_2$) | TMA |

TABLE I-continued
PREPARATION OF IMIDES

| | A | B | C |
|---|---|---|---|
| (11) | [imide-phenyl-CH₂-phenyl-imide with HOOC and COOH substituents] | [4,4'-diaminodiphenylmethane: H₂N-C₆H₄-CH₂-C₆H₄-NH₂] | TMA |
| (12) | [bis-imide structure with CHOH-CH₂ groups linked by N-CH₂-CH₂-N] | H₂N—CH₂—CH₂—NH₂ | HOOC—CH(OH)—CH₂—COOH |
| (13) | [phthalimide with N-CH₂-COOH and HOOC substituent on ring] | H₂N—CH₂—COOH | TMA |
| (14) | [phthalimide with N-CH₂-CH₂-COOH and HOOC substituent on ring] | H₂N—CH₂—CH₂—COOH | TMA |
| (15) | [cyclohexene-dicarboximide with N-CH₂-CHOH-CH₂OH] | CH₂—CH—CH₂ with H₂N, OH, OH | [tetrahydrophthalic anhydride structure] |

TABLE I-continued
PREPARATION OF IMIDES
| A | B | C |
|---|---|---|
| (16) 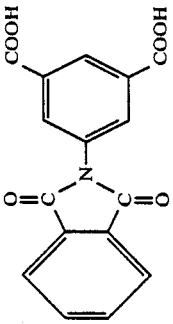 | 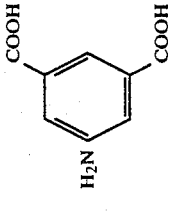 | 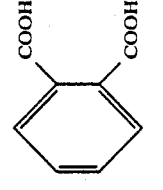 |

From the listed compounds 1 to 16, it is evident that reaction products can be used, for instance, of
(1) Tetracarboxylic acids and amino alcohols,
(2) Tetracarboxylic acids and aminocarboxylic acids,
(3) Tricarboxylic acids and amino alcohols,
(4) Tricarboxylic acids and aminocarboxylic acids,
(5) Tricarboxylic acids and primary diamines,
(6) Hydroxydicarboxylic acids and amino alcohols,
(7) Hydroxycarboxylic acids and aminocarboxylic acids,
(8) Hydroxydicarboxylic acids and diamines,
(9) Dicarboxylic acids and amino diols,
(10) Dicarboxylic acids and aminodicarboxylic acids.

Particularly important can be compounds which include aromatic polycarboxylic acids and/or aromatic primary amines. The compounds produced herein, in which the imide rings are directly bound to an aromatic ring or are part of an aromatic system, may be important for special applications of the resins, for instance, in the field of electric insulation.

The invention also relates to methods for preparing unsaturated homo- and/or copolymerizable polyesters from an alcohol component comprising a multivalent alcohol, an acid component comprising a multivalent carboxylic acid, and optionally, hydroxycarboxylic acids or their derivatives capable of forming esters, and simultaneously incorporating maleic acid, fumaric acid, itaconic acid, mesaconic acid and/or aconitic acid or their derivatives which are capable of forming esters. The method is characterized by the feature that hydroxylated polybutadiene is condensed into the polyester as part of the alcohol component. The polybutadiene will have an average molecular weight of about 2400 to 3000 and about 2.2 to 2.4 hydroxyl groups per mole.

Preferably, about 1 to 10 mol percent of the total amount of alcohol used will be represented by the hydroxylated polybutadiene. Preferably nitrogen-containing imides of the general formulae

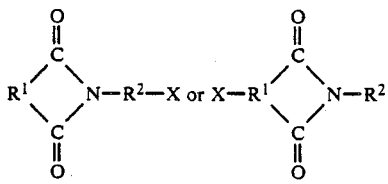

are co-used in the preparation of the polyesters, or the polyester is reacted with the nitrogen-containing compounds of the general formulae above, wherein $R^1$ stands for an aliphatic radical, in which the two carboxyl radicals capable of forming anhydride are in the 1,2- or 1,3 position; $R^2$ is an alkyl or aryl radical; and X is an OH or COOH radical where optionally the linkage of the hydroxyl groups of the nitrogen-containing compounds can take place at the hydroxyl groups of the unsaturated polyester by means of reaction with di- or triisocyanate compounds.

In another embodiment of the method according to the invention, radicals of a dicarboxylic acid, a dialcohol and/or a hydroxycarboxylic acid having at least one 5-membered cyclic imide group are condensed into the polyester.

The unsaturated polyesters are prepared by known methods of fusion condensation. By such methods, more or less pronounced gelatin-like unsaturated polyesters are produced which, depending on the content of hydroxylated polybutadiene resin used in the melt at 200° C., are highly soluble in styrene and react to form unsaturated polyester resins. The latter exhibit a strongly pronounced structural viscosity and thixotropy even when they contain a very high styrene content.

The invention also relates to the use of a solution of the polyesters which is about 40 to 80% by weight polyester containing copolymeriable vinyl and/or allyl monomers, and which further contain known hardeners and optionally, accelerators and flow agents. These solutions are useful for impregnating electric machines or parts thereof, as well as for coating electrical components and circuits. These polyester resins are highly effective as impregnating resins in the construction of electrical machinery, i.e., for impregnating stators, rotors, transformers and other coils. Due to the flow anomalies, the dripping losses prior to hardening as well as the dripping losses during the hardening in the oven are greatly reduced. The use of the present resins improves the filling of the cavities in the windings between the wires over that observed with conventional unsaturated polyester resin impregnating media. An improved solidification of the windings and enhanced heat removal from the windings results.

Due to the reduction of the dripping losses during the hardening in the oven, a cost savings results since less material is lost in the oven as hardened drippings which must be discarded. If the unsaturated polyester resins are used as coating compounds for electrical or electronic components and circuitry, conventional fillers and/or reinforcement materials such as quartz meal, chalk, aluminum hydroxide or asbestos or glass fibers can be admixed with the resins. After suitable photoinitiators are added, these resins can also be hardened by exposure to ultraviolet radiation.

The invention will be described in greater detail by means of the following examples.

EXAMPLE 1

A mixture of 1 mol trimellitic-acid anhydride, 5.8 mol neopentylglycol, 0.2 mol end-position hydroxylated polybutadiene with an average molecular weight of 2800 and a hydroxyfunctionality of 2.2 to 2.4, 6 mol maleic acid anhydride and 3 mol of the reaction product of 1 mol tetrahydrophthalic acid anhydride and 1 mol monoethanolamine are reacted with 10 parts by weight xylene as an entrainer and melted and condensed in a flask equipped with a stirrer, thermometer, reflux cooler and nitrogen inlet tube. The maximum condensation temperature is 175° C. A mixture of xylene and water is distilled off. At an acid number of 40, the composition is rubber-like. The temperature is then lowered to 140° C. and after 0.001% benzoquinone is added, the composition is slowly reacted with 30% styrene. In spite of the rubber-like consistency, the resin is highly soluble in styrene. After cooling to room temperature, the material has a viscosity of about 6000 mPas (measured with a Visko balance, ball 2). Upon standing, the resin gels to a gel-like mass which can be converted into a liquid by stirring. The resin is diluted with styrene to a viscosity of 200 mPas and reacted with 1% tert.-butylperbenzoate as a hardener. The resultant impregnating resin is used to impregnate 7 miniature motor coils which consist of 75 turns of copper wire 1 mm thick. After dripping the resin on for 15 minutes at room temperature, the resultant impregnated miniature motor coils are hardened by heating for 1 hour at 120° C. and for 1 hour at 140° C. in a circulating-air oven. The dripping losses observed in the oven are only between 3 and 5%.

EXAMPLE 2

According to the procedure of Example 1, a linear polyester is prepared from 2.64 mole diethyleneglycol, 7.63 mol tetrahydrophthalic-acid anhydride, 7.6 mol neopentylglycol, 0.4 mol hydroxylated polybutadiene according to Example 1 and 3.35 mol maleic acid anhydride. At an acid number of 44, the condensation reaction is stopped and the product is dissolved in styrene. It is adjusted with styrene to a viscosity of 400 mPas at 23° C. The polyester resin obtained in this matter is used to impregnate coils. Printed circuits are coated with the resin by an immersion process. Again, small dripping losses are obtained and excellent impregnation or coating is obtained.

COMPARATIVE EXAMPLE

According to the procedure of Example 1, a polyester resin is prepared from 1 mol trimellitic acid anhydride, 6 mol neopentylglycol, 6 mol maleic-acid anhydride and 3 mol of the reaction product of 1 mol tetrahydrophthalic-acid anhydride and 1 mol monoethanolamine. The viscosity is adjusted with styrene as in Example 1. If this polyester resin is used for impregnating miniature motor coils, a dripping loss of 10 to 15% is obtained in the oven.

We claim:

1. An unsaturated homo- and/or copolymerizable polyester prepared by the simultaneous reaction of:
    (a) a diol selected from the group consisting of glycol, propane diol, butane diol, hexane diol, neopentyl glycol, trimethyl hexane diol, cyclohexane dimethanol, tricyclodecane diol, 1,1-bishydroxymethylcyclohexene-3, and tricyclodecane monoglycerin ether;
    (b) a dicarboxylic acid selected from the group consisting of maleic acid, fumaric acid, itaconic acid, mesaconic acid, aconitic acid, esters thereof, anhydrides thereof and acid chlorides thereof;
    (c) an end-position hydroxylated polybutadiene having an average molecular weight of about 2400 to 3000, an average hydroxy functionality of about 2.2 to 2.4, and a microstructure of about 60 percent 1,4-trans, about 20 percent 1,4-cis and about 20 percent vinyl, the amount of said hydroxylated polybutadiene being from 1 to 10 mol percent relative to the total amount of diol and hydroxylated polybutadiene present in the polyester.

2. The polyester according to claim 1 wherein the polyester is modified with a nitrogen containing compound having the general formulae

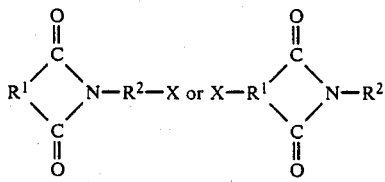

wherein $R^1$ is an aliphatic radical in which two carboxyl radicals capable of forming anhydrides are in the 1,2- or 1,3 position; $R^2$ is an alkyl or aryl radical; and X is an OH or COOH radical.

3. The polyester according to claim 2, wherein X is a hydroxyl and bound to the polyester via a compound selected from the group consisting of diisocyanates and triisocyanates.

4. The polyester according to claim 1 wherein the carboxylic acid or derivative thereof further includes at least one hydroxyl group.

5. An unsaturated homo- and/or copolymerizable polyester according to claim 1, wherein the components are further defined as:
    (a) trimellitic acid anhydride;
    (b) neopentyl glycol;
    (c) said end-position hydroxylated polybutadiene having an average molecular weight of about 2800 and a hydroxyfunctionality of about 2.2 to 2.4;
    (d) maleic acid anhydride; and
    (e) the reaction product of tetrahydrophthalic acid anhydride and monoethanolamine.

6. An unsaturated homo- and/or copolymerizable polyester according to claim 1 wherein the components are further defined as:
    (a) tetrahydrophthalic acid anhydride;
    (b) neopentyl glycol;
    (c) said end-position hydroxylated polybutadiene having an average molecular weight of about 2800 and a hydroxyfunctionality of about 2.2–2.4; and
    (d) maleic anhydride.

7. A method for preparing an unsaturated homo and-/or copolymerizable polyester comprising simultaneously reacting
    (a) a diol selected from the group consisting of glycol, propane diol, butane diol, hexane diol, neopentyl glycol, trimethyl hexane diol, cyclohexane dimethanol, tricyclodecane diol, 1,1-bishydroxymethylcyclohexene-3 and tricyclodecane monoglycerin ether;
    (b) a dicarboxylic acid selected from the group consisting of maleic acid, fumaric acid, itaconic acid, mesaconic acid, aconitic acid, esters thereof, anhydrides thereof and acid chlorides thereof;
    (c) an end-position hydroxylated polybutadiene having an average molecular weight of about 2400 to 3000, an average hydroxyl functionality of about 2.2 to 2.4, and a microstructure of about 60 percent 1,4-trans, about 20 percent 1,4-cis and about 20 percent vinyl, the amount of said hydroxylated polybutadiene being from 1 to 10 mol percent relative to the total amount of diol and hydroxylated polybutadiene present in the polyester.

8. The method according to claim 7 wherein the polyester is modified with a nitrogen containing compound having the general formulae

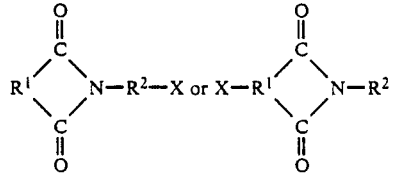

wherein $R^1$ stands for an aliphatic radical in which two carboxyl radicals capable of forming anhydrides are in the 1,2- or 1,3 position; $R^2$ is an alkyl or aryl radical; and X is an OH or COOH radical.

9. The method according to claim 8 wherein X is a hydroxyl and bound to the polyester via a compound selected from the group consisting of diisocyanates and tri-isocyanates.

10. The method according to claim 7 wherein the carboxylic acid or derivative thereof further includes at least one hydroxyl group.

* * * * *